(12) United States Patent  
Hoppmann et al.

(10) Patent No.: US 12,552,095 B2  
(45) Date of Patent: Feb. 17, 2026

(54) PARTICLE MATERIAL PREHEATING DEVICE AND USE IN 3D METHODS

(71) Applicant: Voxeljet AG, Friedberg (DE)

(72) Inventors: Christoph Hoppmann, Dasing (DE); Ingo Ederer, Geltendorf (DE); Roman Scheller, Mering (DE)

(73) Assignee: VOXELJET AG, Friedberg (DE)

( * ) Notice: Subject to any disclaimer, the term of this patent is extended or adjusted under 35 U.S.C. 154(b) by 113 days.

(21) Appl. No.: 17/776,072

(22) PCT Filed: Nov. 11, 2020

(86) PCT No.: PCT/DE2020/000278  
§ 371 (c)(1),  
(2) Date: May 11, 2022

(87) PCT Pub. No.: WO2021/093911  
PCT Pub. Date: May 20, 2021

(65) Prior Publication Data  
US 2022/0379553 A1  Dec. 1, 2022

(30) Foreign Application Priority Data  
Nov. 13, 2019  (DE) .................... 10 2019 007 863.2

(51) Int. Cl.  
*B29C 64/329* (2017.01)  
*B29C 64/159* (2017.01)  
*B29C 64/209* (2017.01)  
*B29C 64/214* (2017.01)  
*B29C 64/255* (2017.01)  
*B29C 64/295* (2017.01)  
*B29C 64/314* (2017.01)  
*B29C 64/321* (2017.01)  
(Continued)

(52) U.S. Cl.  
CPC .......... *B29C 64/159* (2017.08); *B29C 64/209* (2017.08); *B29C 64/214* (2017.08); *B29C 64/255* (2017.08); *B29C 64/295* (2017.08); *B29C 64/314* (2017.08); *B29C 64/321* (2017.08); *B33Y 10/00* (2014.12); *B33Y 30/00* (2014.12); *B33Y 40/10* (2020.01)

(58) Field of Classification Search  
None  
See application file for complete search history.

(56) References Cited

U.S. PATENT DOCUMENTS 4,247,508 A   1/1981   Housholder  
4,575,330 A   3/1986   Hull  
(Continued)

FOREIGN PATENT DOCUMENTS

AU    720255 B2     5/2000  
CN    101146666 A   3/2008  
(Continued)

OTHER PUBLICATIONS

US 4,937,420 A, 06/1990, Deckard (withdrawn)  
(Continued)

*Primary Examiner* — Yung-Sheng M Tsui  
(74) *Attorney, Agent, or Firm* — The Dobrusin Law Firm, P.C.

(57) ABSTRACT

The invention relates to a device and to a method for producing 3D moulded parts, wherein a preheating container is used.

19 Claims, 4 Drawing Sheets

(51) Int. Cl.
  *B33Y 10/00* (2015.01)
  *B33Y 30/00* (2015.01)
  *B33Y 40/10* (2020.01)

(56) References Cited

U.S. PATENT DOCUMENTS

| | | | |
|---|---|---|---|
| 4,665,492 A | 5/1987 | Masters |
| 4,752,352 A | 6/1988 | Feygin |
| 4,752,498 A | 6/1988 | Fudim |
| 4,944,817 A | 7/1990 | Bourell et al. |
| 5,017,753 A | 5/1991 | Deckard |
| 5,031,120 A | 7/1991 | Pomerantz et al. |
| 5,047,182 A | 9/1991 | Sundback et al. |
| 5,059,266 A | 10/1991 | Yamane et al. |
| 5,120,476 A | 6/1992 | Scholz |
| 5,126,529 A | 6/1992 | Weiss et al. |
| 5,127,037 A | 6/1992 | Bynum |
| 5,134,569 A | 7/1992 | Masters |
| 5,136,515 A | 8/1992 | Helinski |
| 5,149,548 A | 9/1992 | Yamane et al. |
| 5,155,324 A | 10/1992 | Deckard et al. |
| 5,156,697 A | 10/1992 | Bourell et al. |
| 5,248,456 A | 9/1993 | Evans, Jr. et al. |
| 5,252,264 A | 10/1993 | Forderhase et al. |
| 5,284,695 A | 2/1994 | Barlow et al. |
| 5,342,919 A | 8/1994 | Dickens, Jr. et al. |
| 5,352,405 A | 10/1994 | Beaman et al. |
| 5,387,380 A | 2/1995 | Cima et al. |
| 5,398,193 A | 3/1995 | deAngelis |
| 5,503,785 A | 4/1996 | Crump et al. |
| 5,518,060 A | 5/1996 | Cleary et al. |
| 5,518,680 A | 5/1996 | Cima et al. |
| 5,555,176 A | 9/1996 | Menhennett et al. |
| 5,637,175 A | 6/1997 | Feygin et al. |
| 5,639,070 A | 6/1997 | Deckard |
| 5,639,402 A | 6/1997 | Barlow et al. |
| 5,647,931 A | 7/1997 | Retallick et al. |
| 5,658,412 A | 8/1997 | Retallick et al. |
| 5,665,401 A | 9/1997 | Serbin et al. |
| 5,717,599 A | 2/1998 | Menhennett et al. |
| 5,730,925 A | 3/1998 | Mattes et al. |
| 5,740,051 A | 4/1998 | Sanders, Jr. et al. |
| 5,749,041 A | 5/1998 | Lakshminarayan et al. |
| 5,753,274 A | 5/1998 | Wilkening et al. |
| 5,824,250 A | 10/1998 | Whalen |
| 5,851,465 A | 12/1998 | Bredt |
| 5,884,688 A | 3/1999 | Hinton et al. |
| 5,902,537 A | 5/1999 | Almquist et al. |
| 5,934,343 A | 8/1999 | Gaylo et al. |
| 5,940,674 A | 8/1999 | Sachs et al. |
| 5,943,235 A | 8/1999 | Earl et al. |
| 5,989,476 A | 11/1999 | Lockard et al. |
| 6,048,188 A | 4/2000 | Hull et al. |
| 6,048,954 A | 4/2000 | Barlow et al. |
| 6,146,567 A | 11/2000 | Sachs et al. |
| 6,147,138 A | 11/2000 | Hochsmann et al. |
| 6,155,331 A | 12/2000 | Langer et al. |
| 6,164,850 A | 12/2000 | Speakman |
| 6,165,406 A | 12/2000 | Jang et al. |
| 6,169,605 B1 | 1/2001 | Penn et al. |
| 6,193,922 B1 | 2/2001 | Ederer |
| 6,210,625 B1 | 4/2001 | Matsushita |
| 6,217,816 B1 | 4/2001 | Tang |
| 6,243,616 B1 | 6/2001 | Droscher et al. |
| 6,259,962 B1 | 7/2001 | Gothait |
| 6,270,335 B2 | 8/2001 | Leyden et al. |
| 6,305,769 B1 | 10/2001 | Thayer et al. |
| 6,335,097 B1 | 1/2002 | Otsuka et al. |
| 6,375,874 B1 | 4/2002 | Russell et al. |
| 6,403,002 B1 | 6/2002 | Van Der Geest |
| 6,405,095 B1 | 6/2002 | Jang et al. |
| 6,423,255 B1 | 7/2002 | Hoechsmann et al. |
| 6,500,378 B1 | 12/2002 | Smith |
| 6,554,600 B1 | 4/2003 | Hofmann et al. |
| 6,596,224 B1 | 7/2003 | Sachs et al. |
| 6,658,314 B1 | 12/2003 | Gothait |
| 6,672,343 B1 | 1/2004 | Perret et al. |
| 6,713,125 B1 | 3/2004 | Sherwood et al. |
| 6,722,872 B1 | 4/2004 | Swanson et al. |
| 6,733,528 B2 | 5/2004 | Abe et al. |
| 6,827,988 B2 | 12/2004 | Krause et al. |
| 6,830,643 B1 | 12/2004 | Hayes |
| 6,838,035 B1 | 1/2005 | Ederer et al. |
| 6,896,839 B2 | 5/2005 | Kubo et al. |
| 7,120,512 B2 | 10/2006 | Kramer et al. |
| 7,153,463 B2 | 12/2006 | Leuterer et al. |
| 7,291,002 B2 | 11/2007 | Russell et al. |
| 7,296,990 B2 | 11/2007 | Devos et al. |
| 7,332,537 B2 | 2/2008 | Bredt et al. |
| 7,348,075 B2 | 3/2008 | Farr et al. |
| 7,378,052 B2 | 5/2008 | Harryson |
| 7,455,805 B2 | 11/2008 | Oriakhi et al. |
| 7,497,977 B2 | 3/2009 | Nielsen et al. |
| 7,597,835 B2 | 10/2009 | Marsac |
| 7,641,461 B2 | 1/2010 | Khoshnevis |
| 7,790,096 B2 | 9/2010 | Merot et al. |
| 7,799,253 B2 | 9/2010 | Höschmann et al. |
| 8,186,415 B2 | 5/2012 | Marutani et al. |
| 8,574,485 B2 | 11/2013 | Kramer |
| 8,951,033 B2 | 2/2015 | Höchsmann et al. |
| 9,327,450 B2 | 5/2016 | Hein et al. |
| 2001/0045678 A1 | 11/2001 | Kubo et al. |
| 2001/0050031 A1 | 12/2001 | Bredt et al. |
| 2002/0015783 A1 | 2/2002 | Harvey |
| 2002/0016387 A1 | 2/2002 | Shen |
| 2002/0026982 A1 | 3/2002 | Bredt et al. |
| 2002/0079601 A1 | 6/2002 | Russell et al. |
| 2002/0090410 A1 | 7/2002 | Tochimoto et al. |
| 2002/0111707 A1 | 8/2002 | Li et al. |
| 2002/0155254 A1 | 10/2002 | McQuate et al. |
| 2002/0167100 A1 | 11/2002 | Moszner et al. |
| 2003/0004599 A1 | 1/2003 | Herbak |
| 2003/0083771 A1 | 5/2003 | Schmidt |
| 2003/0114936 A1 | 6/2003 | Sherwood et al. |
| 2004/0003738 A1 | 1/2004 | Imiolek et al. |
| 2004/0012112 A1 | 1/2004 | Davidson et al. |
| 2004/0025905 A1 | 2/2004 | Ederer et al. |
| 2004/0026418 A1 | 2/2004 | Ederer et al. |
| 2004/0035542 A1 | 2/2004 | Ederer et al. |
| 2004/0036200 A1 | 2/2004 | Patel et al. |
| 2004/0038009 A1 | 2/2004 | Leyden et al. |
| 2004/0045941 A1 | 3/2004 | Herzog et al. |
| 2004/0056378 A1 | 3/2004 | Bredt et al. |
| 2004/0094058 A1 | 5/2004 | Kasperchik et al. |
| 2004/0112523 A1 | 6/2004 | Crom |
| 2004/0145088 A1 | 7/2004 | Patel et al. |
| 2004/0170765 A1 | 9/2004 | Ederer et al. |
| 2004/0187714 A1 | 9/2004 | Napadensky et al. |
| 2004/0207123 A1 | 10/2004 | Patel et al. |
| 2004/0239009 A1 | 12/2004 | Collins et al. |
| 2005/0003189 A1 | 1/2005 | Bredt et al. |
| 2005/0017386 A1 | 1/2005 | Harrysson |
| 2005/0017394 A1 | 1/2005 | Hochsmann et al. |
| 2005/0074511 A1 | 4/2005 | Oriakhi et al. |
| 2005/0079086 A1 | 4/2005 | Farr |
| 2005/0093194 A1 | 5/2005 | Oriakhi et al. |
| 2005/0167872 A1 | 8/2005 | Tsubaki et al. |
| 2005/0174407 A1 | 8/2005 | Johnson et al. |
| 2005/0179167 A1 | 8/2005 | Hachikian |
| 2005/0212163 A1 | 9/2005 | Bausinger et al. |
| 2005/0218549 A1 | 10/2005 | Farr et al. |
| 2005/0276976 A1 | 12/2005 | Pfeifer et al. |
| 2005/0280185 A1 | 12/2005 | Russell et al. |
| 2006/0012058 A1 | 1/2006 | Hasei |
| 2006/0103054 A1 | 5/2006 | Pfeifer et al. |
| 2006/0105102 A1 | 5/2006 | Hochsmann et al. |
| 2006/0159896 A1 | 7/2006 | Pfeifer et al. |
| 2006/0175346 A1 | 8/2006 | Ederer et al. |
| 2006/0180957 A1 | 8/2006 | Hopkinson |
| 2006/0208388 A1 | 9/2006 | Bredt et al. |
| 2006/0237159 A1 | 10/2006 | Hochsmann |
| 2006/0251535 A1 | 11/2006 | Pfeifer et al. |
| 2006/0254467 A1 | 11/2006 | Farr et al. |
| 2006/0257579 A1 | 11/2006 | Farr et al. |

(56) References Cited

U.S. PATENT DOCUMENTS

| | | |
|---|---|---|
| 2007/0045891 A1 | 3/2007 | Martinoni |
| 2007/0057412 A1 | 3/2007 | Weiskopf et al. |
| 2007/0126157 A1 | 6/2007 | Bredt |
| 2007/0238056 A1 | 10/2007 | Baumann et al. |
| 2007/0241482 A1 | 10/2007 | Giller et al. |
| 2008/0001331 A1 | 1/2008 | Ederer |
| 2008/0003390 A1 | 1/2008 | Hayashi |
| 2008/0018018 A1 | 1/2008 | Nielsen et al. |
| 2008/0047628 A1 | 2/2008 | Davidson et al. |
| 2008/0138515 A1 | 6/2008 | Williams |
| 2008/0187711 A1 | 8/2008 | Alam et al. |
| 2008/0233302 A1 | 9/2008 | Elsner et al. |
| 2008/0241404 A1 | 10/2008 | Allaman et al. |
| 2008/0260945 A1 | 10/2008 | Ederer et al. |
| 2008/0299321 A1 | 12/2008 | Ishihara |
| 2009/0068376 A1 | 3/2009 | Philippi et al. |
| 2010/0007048 A1 | 1/2010 | Schweininger |
| 2010/0007062 A1 | 1/2010 | Larsson et al. |
| 2010/0207288 A1 | 8/2010 | Dini |
| 2010/0212584 A1 | 8/2010 | Ederer et al. |
| 2010/0244301 A1 | 9/2010 | Ederer et al. |
| 2010/0247742 A1 | 9/2010 | Shi et al. |
| 2010/0272519 A1 | 10/2010 | Ederer et al. |
| 2010/0279007 A1 | 11/2010 | Briselden et al. |
| 2010/0291314 A1 | 11/2010 | Kahani-Shirazi |
| 2010/0323301 A1 | 12/2010 | Tang et al. |
| 2011/0049739 A1 | 3/2011 | Uckelmann et al. |
| 2011/0059247 A1 | 3/2011 | Kuzusako et al. |
| 2011/0177188 A1 | 7/2011 | Bredt et al. |
| 2011/0223437 A1 | 9/2011 | Ederer et al. |
| 2012/0046779 A1 | 2/2012 | Pax et al. |
| 2012/0057143 A1 | 3/2012 | Jamar et al. |
| 2012/0097258 A1 | 4/2012 | Harmann et al. |
| 2012/0113439 A1 | 5/2012 | Ederer et al. |
| 2012/0126457 A1 | 5/2012 | Abe et al. |
| 2012/0291701 A1 | 11/2012 | Grasegger et al. |
| 2013/0000549 A1 | 1/2013 | Hartmann et al. |
| 2013/0004610 A1 | 1/2013 | Hartmann et al. |
| 2013/0026680 A1 | 1/2013 | Ederer et al. |
| 2013/0029001 A1 | 1/2013 | Gunther et al. |
| 2013/0052291 A1 | 2/2013 | Morikawa |
| 2013/0199444 A1 | 8/2013 | Hartmann |
| 2013/0234355 A1 | 9/2013 | Hartmann et al. |
| 2013/0302575 A1 | 11/2013 | Mogele et al. |
| 2014/0048980 A1 | 2/2014 | Crump et al. |
| 2014/0065194 A1 | 3/2014 | Yoo |
| 2014/0212677 A1 | 7/2014 | Gnuchtel et al. |
| 2014/0227123 A1 | 8/2014 | Gunster |
| 2014/0271961 A1 | 9/2014 | Khoshnevis |
| 2014/0306379 A1 | 10/2014 | Hartmann et al. |
| 2015/0042018 A1 | 2/2015 | Gunther et al. |
| 2015/0110910 A1 | 4/2015 | Hartmann et al. |
| 2015/0224718 A1 | 8/2015 | Ederer et al. |
| 2015/0266238 A1 | 9/2015 | Ederer et al. |
| 2015/0273572 A1 | 10/2015 | Ederer et al. |
| 2015/0290881 A1 | 10/2015 | Ederer et al. |
| 2015/0375419 A1 | 12/2015 | Gunther et al. |
| 2016/0236422 A1 | 8/2016 | Sakura |
| 2016/0263828 A1 | 9/2016 | Ederer et al. |
| 2016/0303762 A1 | 10/2016 | Gunther |
| 2016/0311167 A1 | 10/2016 | Gunther et al. |
| 2016/0311210 A1 | 10/2016 | Gunther et al. |
| 2016/0318251 A1 | 11/2016 | Ederer et al. |
| 2016/0339644 A1 | 11/2016 | Sobue et al. |
| 2017/0050378 A1 | 2/2017 | Ederer |
| 2017/0072463 A1 | 3/2017 | Ng et al. |
| 2017/0080607 A1 | 3/2017 | Sahara et al. |
| 2017/0106595 A1 | 4/2017 | Gunther et al. |
| 2017/0151722 A1 | 6/2017 | Prasad et al. |
| 2017/0151727 A1 | 6/2017 | Ederer et al. |
| 2017/0157852 A1 | 6/2017 | Ederer et al. |
| 2017/0182711 A1 | 6/2017 | Gunther et al. |
| 2017/0210037 A1 | 7/2017 | Ederer et al. |
| 2017/0297263 A1 | 10/2017 | Ederer et al. |
| 2017/0305139 A1 | 10/2017 | Hartmann |
| 2017/0355137 A1 | 12/2017 | Ederer et al. |
| 2018/0017957 A1 | 1/2018 | Morovic et al. |
| 2018/0022923 A1 | 1/2018 | Emamjomeh et al. |
| 2018/0056393 A1 | 3/2018 | Herzog et al. |
| 2018/0065297 A1 | 3/2018 | Zhoa et al. |
| 2018/0079133 A1 | 3/2018 | Ederer et al. |
| 2018/0141271 A1 | 5/2018 | Gunter et al. |
| 2018/0193887 A1 | 7/2018 | Poucher et al. |
| 2018/0243883 A1 | 8/2018 | Brandl |
| 2018/0297284 A1 | 10/2018 | Fulop et al. |
| 2018/0326662 A1 | 11/2018 | Gunther et al. |
| 2018/0369910 A1 | 12/2018 | Gunter et al. |
| 2019/0001570 A1* | 1/2019 | Branham .............. B22F 12/13 |
| 2019/0047218 A1 | 2/2019 | Ederer et al. |
| 2019/0084229 A1 | 3/2019 | Gunther |
| 2019/0126555 A1 | 5/2019 | Lebed |
| 2019/0126607 A1 | 5/2019 | De Penaa et al. |
| 2019/0160751 A1 | 5/2019 | Huang et al. |
| 2019/0263051 A1 | 8/2019 | Sanchez Ribes et al. |
| 2020/0004215 A1 | 1/2020 | Ramirez et al. |
| 2020/0055246 A1 | 2/2020 | Gunther et al. |
| 2020/0130263 A1 | 4/2020 | Gunther et al. |
| 2020/0130274 A1* | 4/2020 | Van Den Ecker ..... B33Y 40/00 |
| 2020/0189259 A1 | 6/2020 | Hartmann et al. |
| 2020/0262141 A1 | 8/2020 | Ederer et al. |
| 2020/0331198 A1* | 10/2020 | Yamada .............. B29C 64/214 |
| 2020/0346408 A1* | 11/2020 | Rode .................. B33Y 10/00 |
| 2021/0316507 A1 | 10/2021 | Grasegger et al. |
| 2022/0219289 A1 | 7/2022 | Griesser et al. |
| 2022/0258412 A1 | 8/2022 | Scheck et al. |
| 2022/0288849 A1 | 9/2022 | Ederer et al. |
| 2022/0363000 A1 | 11/2022 | Heymel et al. |
| 2022/0371267 A1 | 11/2022 | Gnuchtel et al. |
| 2022/0379553 A1 | 12/2022 | Hoppman et al. |
| 2022/0402203 A1 | 12/2022 | Scheck et al. |
| 2022/0402209 A1 | 12/2022 | Heymel et al. |

FOREIGN PATENT DOCUMENTS

| | | |
|---|---|---|
| CN | 110142958 A | 8/2019 |
| DE | 3221357 A1 | 12/1983 |
| DE | 3930750 C2 | 3/1991 |
| DE | 4102260 A1 | 7/1992 |
| DE | 4305201 C1 | 4/1994 |
| DE | 4 325 573 A1 | 2/1995 |
| DE | 29506204 U1 | 6/1995 |
| DE | 4440397 | 9/1995 |
| DE | 19530295 C1 | 1/1997 |
| DE | 19528215 A1 | 2/1997 |
| DE | 29701279 U1 | 5/1997 |
| DE | 19545167 A1 | 6/1997 |
| DE | 69031808 T2 | 4/1998 |
| DE | 19853834 | 5/2000 |
| DE | 69634921 T2 | 12/2005 |
| DE | 201 22 639 U1 | 11/2006 |
| DE | 102005022308 B4 | 3/2007 |
| DE | 102006040305 A1 | 3/2007 |
| DE | 102006029298 A1 | 12/2007 |
| DE | 102007040755 A1 | 3/2009 |
| DE | 102007047326 A1 | 4/2009 |
| DE | 102011053205 A1 | 3/2013 |
| DE | 102013004940 A1 | 4/2014 |
| DE | 202016003042 U1 | 7/2016 |
| DE | 102015006363 A1 | 12/2016 |
| DE | 102015219355 A1 | 4/2017 |
| DE | 102017200773 A1 | 7/2018 |
| EP | 0361847 B1 | 4/1990 |
| EP | 0431924 B1 | 1/1996 |
| EP | 1415792 | 5/2004 |
| EP | 1457590 A | 9/2004 |
| EP | 2202016 A1 | 6/2010 |
| EP | 3202534 A1 | 8/2017 |
| GB | 2297516 A | 8/1996 |
| GB | 2575544 A | 1/2020 |
| JP | S62275734 A | 11/1987 |
| JP | 2003/136605 A | 5/2003 |
| JP | 2004/082206 A | 3/2004 |
| JP | 2009/202451 A | 9/2009 |
| WO | 90/03893 A1 | 4/1990 |

(56) References Cited

FOREIGN PATENT DOCUMENTS

| WO | 01/40866 A2 | 6/2001 |
|---|---|---|
| WO | 2004/014637 A1 | 2/2004 |
| WO | 2006/100166 A1 | 9/2006 |
| WO | 2008/049384 A1 | 5/2008 |
| WO | 2008/061520 A2 | 5/2008 |
| WO | 2011/063786 A1 | 6/2011 |
| WO | 2013/075696 A1 | 5/2013 |
| WO | 2014/090207 A1 | 6/2014 |
| WO | 2014/166469 A1 | 10/2014 |
| WO | 2016/019942 A1 | 2/2016 |
| WO | 2017/008777 A1 | 1/2017 |
| WO | 2019/027404 A1 | 2/2019 |
| WO | 2019087745 A1 | 5/2019 |

OTHER PUBLICATIONS

International Search Report for PCT Application No. PCT/DE2020/000278 date mailed Feb. 12, 2021.
Armin Scharf, "Erster 3D-Endlosdrucker", zwomp.de, http://www.zwomp.de/2012/11/06/voxeljet-endlosdrucker/ dated Nov. 6, 2012.
Cima et al., "Computer-derived Microstructures by 3D Printing: Bio- and Structural Materials," SFF Symposium, Austin, TX, 1994.
EOS Operating Manual for Laser Sintering Machine with Brief Summary Feb. 22, 2005.
Feature Article—Rapid Tooling—Cast Resin and Sprayed Metal Tooling by Joel Segal, Apr. 2000.
Gebhart, Rapid Prototyping, pp. 118-119, 1996.
International Preliminary Report on Patentability, PCT Application No. PCT/DE2020/000278, dated May 17, 2022.
Jacobs et al., 2005 SME Technical Paper, title "Are QuickCast Patterns Suitable for Limited Production?".
Marcus et al., Solid Freedom Fabrication Proceedings, Nov. 1993.
Marcus, et al., Solid Freeform Fabrication Proceedings, Sep. 1995, pp. 130-133.
Sachs et al., "Three-Dimensional Printing: Rapid Tooling and Prototypes Directly from a CAD Model", Massachusetts Institute of Technology, pp. 143-151, Jan. 1990.
Sachs, E., P. Williams, D. Brancazio, M. Cima, and K. Kremmin, Three dimensional printing: Rapid Tooling and Prototypes Directly from a CAD Model. In Proceedings of Manufacturing International 1990 (Atlanta, GA, Mar. 25-28). ASME, New York, 1990, pp. 131-136.
Screen shots of URL: http://www.youtube.com/watch?v=hgIrNXZjIxU taken in approximately 5 second intervals on Nov. 12, 2015.
Williams, "Feasibility Study of Investment Casting Pattern Design by Means of Three Dimensional Printing", Department of Mechanical Engineering, abstract only; Sep. 25, 2001.

\* cited by examiner

PARTICLE MATERIAL PREHEATING DEVICE AND USE IN 3D METHODS

PRIORITY CLAIM

This application is a national phase filing under 35 USC § 371 from PCT Patent Application serial number PCT/DE2020/000278 filed on Nov. 11, 2020 and claims priority therefrom. This application further claims priority to German Patent Application Number DE 102019007863.2 filed on Nov. 13, 2019. International Patent Application number PCT/DE2020/000278 and German Patent Application number DE 102019007863.2 are each incorporated herein by reference in its entirety.

FIELD

The invention relates to a preheating container and to a device and method for producing 3D moldings using a preheating container.

DESCRIPTION

European Patent EP 0 431 924 B1 describes a process for producing three-dimensional objects based on computer data. In the process, a thin layer of particle material is deposited on a platform by means of a recoater and has a binder material selectively printed thereon by means of a print head. The particle region with the binder printed thereon bonds and solidifies under the influence of the binder and, optionally, an additional hardener. Next, the build platform is lowered by one layer thickness or the recoater/print head unit is raised and a new layer of particle material is applied, the latter also being printed on selectively as described above. These steps are repeated until the desired height of the object is achieved. Thus, the printed and solidified regions form a three-dimensional object (3D part, molding).

Upon completion, the object made of solidified particle material is embedded in loose particle material, from which it is subsequently freed. For this purpose a suction device may be used, for example. This leaves the desired objects, which are then further cleaned of any residual powder, e.g. by brushing it off.

Other powder-based rapid prototyping processes, e.g. selective laser sintering or electron beam sintering, work in a similar manner, also applying loose particle material layer by layer and selectively solidifying it using a controlled physical source of radiation.

In the following, all these processes will be summarized by the term "three-dimensional printing method" or "3D printing method".

In some cases, the particle materials in the 3D printer are heated to a predetermined temperature above ambient to produce certain effects in the building process. Among other things, it may be necessary to bring the particle material to a temperature close to the melting temperature before a further selective irradiation step brings it to a temperature above that very melting temperature at the desired locations, where it bonds together. Such a process is described, for example, in DE102005022308B4. However, there the particle material is heated in the recoater itself, with at least part of a heating element at least partially integrated in the side walls or the coating blade. This has the disadvantage that the heat transfer has a gradient and is therefore not so efficient. In addition, the residence time of the particle material in the recoater is relatively short, so that the target temperature is not reached or only partially reached, and a temperature gradient also occurs in the particle material, depending on whether the particle material was close to the wall of the recoater or further away from it. A solution as described in the present application is neither disclosed nor anticipated therein.

The method described in DE102013004940A1 uses, instead of a laser, an IR absorber printed on the preheated particle material and another radiation source that selectively heats, to a temperature above the melting temperature, the areas of the particle material that were previously printed on. A solution as described in the present application is neither disclosed nor anticipated therein.

In the method shown in DE102015006363A1, a liquid binder printed in fine droplets via a print head requires a certain temperature to cure and form the desired moldings in the particle bed. This temperature is advantageously introduced into the binder via heat conduction through the particle material. This is because the binder will cure with increasing temperature, thus increasing viscosity. Under no circumstances should this happen in the print head, as curing of the binder there would lead to failure of the nozzles and thus possibly to print head failure. The binder must therefore be metered into the print head at as constant a temperature as possible, far enough from the curing temperature. Once on the build field, however, it must then be ensured that the binder cures sufficiently quickly. This is because the increase in viscosity due to the curing of the binder causes any migration movement of the binder droplets in the particle bed due to capillary forces or gravity to be slowed down. As a result, the resolution and accuracy of the printed moldings increase as the temperature of the binder increases. A solution as described in the present application is neither disclosed nor anticipated therein.

In the methods shown, temperature is introduced into the particle material via various routes. One possibility is to irradiate the build field with the particle material freshly spread for a layer. The irradiation is usually carried out using infrared radiation, which is introduced e.g. via a heating coil emitter. For this to work, the particle material must guarantee good coupling of the wavelength.

In addition, there must be a possibility for heat conduction between the particles, since a coating usually consists of several layers of particles on top of each other and the radiation does not reach all particles due to shadowing effects. Otherwise, particles at the lower end of the current coating would remain at the input temperature.

As a rule, a significant portion of the radiant energy does not reach the particle material, but heats the process chamber atmosphere, the process chamber enclosure, and other components located in the process chamber. This may mean that the process chamber must have air conditioning to maintain the temperature of the process chamber atmosphere at a constant level. In the case of a binder jetting device, the temperature of the process chamber atmosphere should not exceed 60° C.; the required cooling capacity of the air conditioning unit can be correspondingly high. This leads to inefficiency because, on the one hand, energy has to be made available for radiation and, on the other hand, parts of this energy have to be dissipated again to the environment at great expense.

Another disadvantage of radiation heating is the possible shadowing of the radiation source by build field tools moving in the process chamber. As a result, the exposure time of a radiation source is usually shorter than the process time of a layer. The power of a suitable radiation source must be correspondingly high, and the energy losses are correspondingly high as well.

Another possibility is the heating of contact surfaces to the powder as shown in DE102005022308B4. Here, the particle material is then heated via heat conduction, e.g. in the recoater. In this way, other particle material-carrying parts of the printer, such as the build platform and the job box, can also be heated. Electrical resistance heaters are suitable as heaters, but other designs such as heating via circulation of temperature-controlled liquids in fluid lines in the surfaces to be heated are also possible.

The disadvantage here is again that particle material beds generally have significantly poorer thermal conductivity than the original material. This is due to the small contact area between the individual particles and the filling of the spaces in the powder with the low heat-conducting air.

Accordingly, a particle material bed heats up more slowly with increasing distance from the heat source when heat is supplied from outside. This leads to unwanted temperature gradients in the bed, which in the worst case can lead to process problems such as distortion of parts, dimensional deviations or process errors such as lack of bonding.

In addition, heating of particle material in the recoater is problematic because the residence time of the particle material is generally short and only a few layering cycles long. Moreover, as a result of the coating and the associated powder discharge in the recoater, unheated particle material may be discharged.

Last but not least, the insertion of heating elements with sufficient power in a recoater configured to move over the build field is relatively complex and makes the device comparatively heavy and expensive.

Some disadvantages of this design were also described above. It can thus be concluded that DE102005022308B4 neither discloses nor anticipates a solution as described in the present application.

When preheating particle materials, it must also be taken into account that some particle materials age and change their properties when exposed to a certain temperature. Appropriate care must therefore be taken with such particle materials to ensure that the temperature does not become too high, even locally, and that the residence time under the influence of temperature is reduced to a minimum.

It is therefore an object of the present invention to provide a device and a method allowing particle material to be preheated homogeneously, gently and in an energy-saving manner in a 3D printer or/and a 3D printing process, or at least allowing the disadvantages of the prior art to be reduced or avoided altogether.

BRIEF SUMMARY OF THE DISCLOSURE

In one aspect, the disclosure relates to a particle material (building material) preheating container suitable for a 3D printing device, said container comprising one or more heating means, wherein the heating means is/are arranged in the area intended to receive the particle material and wherein the heating means is/are substantially surrounded by the particle material.

In a further aspect, the disclosure relates to a method for producing a molded part by means of particle material application and selective solidification and all further process steps and process means necessary for this purpose, wherein the particle material is heated to a target temperature in a preheating container prior to introduction into the recoater or/and prior to application to the build field.

DETAILED DESCRIPTION OF THE DISCLOSURE

The object underlying the application is achieved by a preheater located inside a particle material container—also referred to as a preheating container. The preheating container is surrounded by the particle material and the particle material flows around the preheater during the 3D printing process. In this case, the particle material container is dimensioned such that the average residence time of the material in the container is a multiple of the layer time of the 3D printing process.

Feed containers provided for filling the recoater have been found to be suitable containers in the sense of the invention. Such feed containers hold several times the particle material required for one layer. In some cases, the feed containers also contain all the particle material needed for a building job.

The feed container can be located in the immediate vicinity of the recoater. This means that it can thus be avoided that heated particle material cools down again on the way to the layer application.

It may be advantageous if the recoater again has thermal insulation or a means of heating to effect "active" insulation. The same applies to the build platform and the job box.

It may also be helpful to achieve the desired build field temperature of the particle material via two or more steps, with one step being heating in the feed container and further heating being achieved, for example, via a radiation source at the recoater or via a stationary radiation source above the build field. These temperature controls of the particle material can be combined as needed.

In the following, several terms will be defined more precisely. Otherwise, the terms used shall have the meanings known to the person skilled in the art.

In the sense of the disclosure, "layer building processes" or "3D printing processes" or "3D processes" or "3D printing", respectively, are all processes known from the prior art which enable the construction of parts in three-dimensional shapes and are compatible with the process components and devices further described herein.

As used in the disclosure, "binder jetting" means that powder is applied in layers onto a build platform, one or more liquids is/are printed on the cross-sections of the part on this powder layer, the position of the build platform is changed by one layer thickness with respect to the previous position, and these steps are repeated until the part is finished. In this context, binder jetting also refers to layer building processes that require a further process component such as layer-by-layer exposure, e.g. with IR or UV radiation.

A "3D molded part", "molded article" or "part" in the sense of the disclosure means any three-dimensional object manufactured by means of the method according to the invention or/and the device according to the invention and exhibiting dimensional stability.

"Build area" is the geometric location where the particle material bed grows during the building process by repeated coating with particle material or through which the bed passes when applying continuous principles. The build area is generally bounded by a bottom, i.e. the build platform, by walls and an open top surface, i.e. the build plane. In continuous principles, there usually are a conveyor belt and limiting side walls. The build area can also be configured in the form of what is called a job box, which constitutes a unit that can be moved in and out of the device and allows batch production, with one job box being moved out after completion of a process to allow a new job box to be moved into the device immediately, thereby increasing both the production volume and, consequently, the performance of the device.

As the "building material" or "particle material" or "powder" or "powder bed" in the sense of the disclosure, all flowable materials known for 3D printing may be used, in particular in the form of a powder, slurry or liquid. These may include, for example, sands, ceramic powders, glass powders and other powders of inorganic or organic materials, such as metal powders, plastic materials, wood particles, fiber materials, celluloses or/and lactose powders, as well as other types of organic, pulverulent materials. The particle material is preferably a free-flowing powder when dry, but a cohesive, cut-resistant powder may also be used. This cohesiveness may also result from adding a binder material or an auxiliary material, e.g. a liquid. The addition of a liquid can result in the particle material being free-flowing in the form of a slurry. In general, particle materials may also be referred to as fluids in the sense of the disclosure.

In the present application, particle material and powder are used synonymously.

The "particle material application" is the process of generating a defined layer of powder. This may be done either on the build platform (build field) or on an inclined plane relative to a conveyor belt in continuous principles. The particle material application will also be referred to below as "recoating".

"Selective liquid application" or "selective binder application" in the sense of the disclosure may be effected after each particle material application or irregularly, depending on the requirements for the molded article and for optimization of the molded article production, e.g. several times with respect to particle material application. In this case, a sectional image of the desired article is printed.

The "device" used for carrying out a method according to the disclosure may be any known 3D printing device which includes the required parts. Common components include recoater, build field, means for moving the build field or other parts in continuous processes, job box, metering devices and heating and irradiating means and other parts which are known to the person skilled in the art and will therefore not be described in detail herein.

The building material according to the disclosure is always applied in a "defined layer" or "layer thickness", which is individually adjusted according to the building material and the process conditions. It is, for example, 0.05 to 5 mm, preferably 0.07 to 2 mm.

A "recoater" within the meaning of the disclosure is a device part that can receive fluid, e.g., particle material such as mineral, metallic or plastic materials, wood in the form of particles, or mixtures thereof, and dispense or apply it layerwise in a controlled manner onto a build platform of a 3D device. The recoater can be elongated and the particle material is located in a reservoir above an outlet opening. However, the recoater may also consist of a stationary blade or a counter-rotating roller, spreading a specific quantity of powder on the build field in front of the blade or roller, respectively.

A "coating blade" as defined in the disclosure is a substantially flat part made of metal or other suitable material, which is located at the outlet opening of the recoater and through which the fluid is dispensed onto the build platform and smoothed down. A recoater may have one or two or more coating blades. A coating blade can be an oscillating blade that performs oscillations in the sense of a rotary motion when excited. Further, this oscillation can be switched on and off by a means for generating oscillations. Depending on the arrangement of the outlet opening, the coating blade is arranged "substantially horizontally" or "substantially vertically" within the meaning of the disclosure.

As used in the disclosure, the "feed container" or "preheating container" is a vessel that contains particle material and delivers an amount thereof to the recoater after each layer or after any number of layers. For this purpose, the feed container can advantageously extend over the entire width of a recoater. The feed container has a closure at the lower end that prevents the particle material from escaping unintentionally. The closure can be configured, for example, as a rotary feeder, a simple slider or other suitable mechanisms according to the prior art. A feed container as defined in the disclosure may contain particle material for more than one layer. Preferably, the feed container even contains particle material for the application of 20 or more layers. The particle material comes either via conveying means from a larger supply in the form of a silo or a big bag, or is filled manually into the container. Filling is preferably performed through an opening at the top edge. This allows the particle material to be conveyed in the feed container by gravity, thus eliminating the need for additional conveying means in the container. The feed container may also have vibration mechanisms to prevent bridging of the particle material in the container. The feed container has an area that receives the particle material, typically located between the side walls and the closure. According to the disclosure, it is advantageous for a heating means to be arranged in the area that receives the particle material. The heating means is arranged so that the particle material flows around the heating means, thus improving the heating of the particle material. The feed container may be stationary, in which case it can be located, for example, above the stopping position of the recoater or above the build field. Refilling can then be carried out as required or/and controlled by the volume quantity with pre-tempered particle material by moving the recoater toward or below the feed container. However, the feed container may also be detachably or non-detachably connected to the recoater. It may also be advantageous for design or/and cost reasons that the recoater is not heatable. The recoater may then have passive insulation. However, the recoater may not be heated at all, nor provided with insulation, if the preheated particle material is delivered to the recoater in a volume substantially equal to, or 1.2 to 2 times, a layer volume, allowing it to be applied to the build field with virtually no residence time in the recoater and thus with substantially no heat loss.

"Emitter assembly" as used in the disclosure means an arrangement of emitter units.

An "emitter unit" as used in the disclosure means a unit that may be rotatably disposed and emits light of a particular spectrum.

A "coolant" as used in the disclosure is a means capable of cooling an emitter unit, such as water or other liquid or a blower air flow.

"Heating means" as used in the disclosure refers to a means used to heat the particle material in the feed container to a desired temperature. A heating means may be any known heating unit compatible with the other parts of the device, which are known to the person skilled in the art and therefore need not be described in detail here. The heating means is not, or not at least partially, integrated into the feed container or recoater, but is merely located in the area that receives the particle material. It may be advantageous to increase the surface area of the heating means by suitable means, thus optimizing heat conduction into the particle material flowing around the heating means. Conceivable means are, for example, ribs or fins, a serpentine or spiral design of the heating means, etc.

A "peripheral area" as used in the disclosure means the area of an emitter assembly that is located at the edge of the emitter assembly and can be delineated from the interior area. In this case, the peripheral area and the interior area form the total area of the emitter assembly in terms of its surface on which the emitter units are mounted.

"Interior area" as used in the disclosure means the area of an emitter assembly that is inside the emitter assembly and can be delineated from the peripheral area.

"3D printer" or "printer" as used in the disclosure means the device in which a 3D printing method can take place. A 3D printer in the sense of the disclosure comprises a means for applying building material, e.g. a fluid such as a particle material, and a solidification unit, e.g. a print head or an energy input means such as a laser or a heat lamp. Other machine components known to the person skilled in the art and components known in 3D printing are combined with the above-mentioned machine components, depending on the specific requirements in each individual case.

A "build field" is the plane or, in a broader sense, the geometric location on or in which a particle material bed grows during the building process by repeated coating with particle material. The build field is frequently bounded by a bottom, i.e. the "build platform", by walls and an open top surface, i.e. the build plane.

The process of "printing" or "3D printing" in the sense of the disclosure summarizes the operations of material application, selective solidification or imprinting and working height adjustment and takes place in an open or closed process chamber.

A "receiving plane" in the sense of the disclosure means the plane onto which the building material is applied. In accordance with the disclosure, the receiving plane is always freely accessible in one spatial direction by a linear movement.

"Build field tool" or "functional unit" in the sense of the disclosure refers to any means or device part used for fluid application, e.g. particle material, and selective solidification in the production of molded parts. Thus, all material application means and layer treatment means are also build field tools or functional units.

According to the disclosure, "spreading out" or "application" means any manner in which the particle material is distributed. For example, a larger quantity of powder may be placed at the starting position of a coating pass and may be distributed or spread out into the layer volume by a blade or a rotating roller.

"Recoater" or "material application means" as used in the disclosure refers to the unit by means of which a fluid is applied onto the build field. The unit may consist of a fluid reservoir and a fluid application unit. According to the present invention, the fluid application unit comprises a fluid outlet and a "coating knife device". Said coating knife device may be a coating blade. However, any other conceivable, suitable coating knife device may be used. For example, rotating rollers or a nozzle are conceivable as well. Material can be fed via reservoirs in a free-flowing manner or via extruder screws, pressurisation or other material conveying devices.

"Warping" refers to the bending up of printed layers due to shrinkage occurring at different times as the bonded particles solidify. This may lead to coating errors when structures rise from the build field plane due to warping and are possibly carried away by the recoater during the next coating operation.

The "print head" or means for selective solidification in the sense of the disclosure usually consists of various components. Among other things, these can be printing modules. The printing modules have a plurality of nozzles from which the "binder" is ejected as droplets onto the build field in a controlled manner. The printing modules are aligned with respect to the print head. The print head is aligned with respect to the machine. This allows the position of a nozzle to be assigned to the machine coordinate system. The plane in which the nozzles are located is usually referred to as the nozzle plate. Another means of selective solidification can also be one or more lasers or other radiation sources or a heat lamp. Arrays of such radiation sources, such as laser diode arrays, can also be considered. It is permissible in the sense of the disclosure to implement selectivity separately from the solidification reaction. Thus, a print head or one or more lasers can be used to selectively treat the layer and other layer treatment means can be used to start the solidification process. In one embodiment, an IR absorber is printed on the particle material, followed by solidification using an infrared source.

"Layer treatment means" in the sense of the disclosure refers to any means suitable for achieving a certain effect in the layer. This may be the aforementioned units such as print heads or lasers, but also heat sources in the form of IR emitters or other radiation sources such as UV emitters, for example. Means for deionisation or ionisation of the layer are also conceivable. What all layer treatment means have in common is that their zone of action is distributed linearly over the layer and that, like the other layering units such as the print head or recoater, they must be guided over the build field to cover the entire layer.

DETAILED DESCRIPTION OF THE DISCLOSURE

The various aspects and advantageous embodiments of the disclosure will be described in more detail below.

The object underlying the application is achieved by a particle material (building material) preheating container suitable for a 3D printing device, said container comprising one or more heating means, wherein the heating means is/are arranged in the area intended to receive the particle material and wherein the heating means is/are substantially surrounded by the particle material.

The object underlying the application is further achieved by a device suitable for a 3D printing method, said device comprising one or more particle material preheating containers comprising one or more heating means substantially surrounded by the particle material.

The solution according to the present disclosure has the advantage that an advantageous heat transfer from the heating element in the feed container to the particle material to be preheated takes place. This is achieved, on the one hand, by the fact that the particle material flows around the heating element and thus a good temperature transfer is achieved. On the other hand, the residence time of the particle material in the feed container is relatively long, considering the overall time of a printing process and a printing job or a printing batch, but also in continuous processes, whereby a good result of preheating of the particle material can be achieved. Furthermore, with the solution disclosed herein, it is possible to use one or more heating elements and to place them in the area intended for the particle material in the feed container, thus increasing the heating power over known devices. Furthermore, it is advantageous that according to the solution described here, in 3D printing devices in which additional heat sources in the build area are to be avoided as far as possible in order to avoid further heating in the build area and the associated disadvantages, the tempering of the particle material can be moved away from the build area and take place upstream of the latter.

In the device or preheating container according to the disclosure, the one or more heating means may have a surface enlargement on its/their surface facing the particle material and may be in the form of ribs, fins, or other suitable structures. This can be advantageous to further improve the heat transfer rate to the particle material and achieve uniform heat distribution.

In the device or preheating container according to the disclosure, the preheating container can be stationary, the preheating container can be arranged in a stationary manner above the build field or/and laterally above the build field, or the preheating container can be coupled to the recoater. Advantageously, the preheating container can be arranged so that the recoater can be easily moved to the preheating container and the preheated particle material can be dispensed and transferred to the recoater in a desired volume.

The device or the preheating container according to the disclosure may advantageously be configured such that the heating means is/are not/not at least partially integrated in the preheating container or/and is/are not/not at least partially integrated in the side walls, the bottom part or/and a coating blade of the preheating container. With the special arrangement of the heating element in the preheating container, an improved heat conduction into the particle material is achieved and thus a substantially uniform temperature distribution in the particle material to be heated can be achieved or at least the heat input into the particle material can be improved compared to known prior art solutions.

In the device or preheating container according to the disclosure, the preheating container may include a particle material delivery means (closure) and the particle material delivery means may be adjustable to deliver a defined volume of particle material, optionally for delivery into the recoater/s or directly onto the build field, preferably the particle material delivery means is not configured as a blade.

In a device or preheating container according to the disclosure, in principle any volume of particle material can be metered into the recoater or onto the build field. It may be advantageous if the defined volume is substantially equal to the volume of a particle material layer on the build field, or is 1.2 to 1.9 times the volume of a particle material layer on the build field, or is 2, 3, 4, 5, 6, 7, 8, 9, or 10 to 12 times the volume of a particle material layer on the build field. In particular, if only small amounts of particle material are fed into the recoater, corresponding essentially to one layer or only a few layers, this particle material will also essentially retain the temperature to which it was brought in the preheating container without cooling significantly. This practically eliminates the need for further heating on the build field, enabling the 3D parts to be built at constant temperatures and in high quality.

Another advantage of the device according to the invention is the reduction of the preheating phase necessary to get the build field to the required temperature before starting a print job.

In a device according to the disclosure, the preheating container may be arranged in a manner that is advantageous to the device and its overall structure, e.g., outside the recoater and build field complex or above the build field or near a reversal point of the recoater. The preheating container may also be arranged upstream of one or more recoaters.

Further, in the device according to the disclosure, a heat source, e.g., in the form of an electrically operated resistance heater, may be directly integrated into the one or more heating means.

In a device according to the disclosure, the one or more heating means may be configured as heat conductors that conduct heat from a source outside the container to the interior, e.g. as a heated liquid or gas. The heat may also be conducted to the inside of the container via a heat conducting body, in the form of a conducting body constructed with ribs, which is heated from the outside by one or more heating means.

In a preferred embodiment, the heat source in the device according to the disclosure may be an electrically powered resistance heater or a fuel powered heater.

It may be advantageous if the heating element has a surface enlargement, and the surface enlargement means are configured so as not to impede with or prevent gravity-induced material drainage.

In a device according to the disclosure, the heating means are arranged in the space for receiving the particle material, with the one or more heating means substantially not contacting the container wall or/and bottom or/and closure. It may be advantageous to maintain a distance of 2 to 5 mm or 1 to 5 cm in this case.

In a further aspect, the disclosure relates to a method for producing a molded part by means of particle material application and selective solidification and all further process steps and process means necessary for this purpose, wherein the particle material is heated to a target temperature in a preheating container prior to introduction into the recoater or/and prior to application to the build field.

In such a method, the target temperature can be set variably and even changed during the process, e.g. after a certain number of layer applications, the target temperature being 50° C. to 190° C., preferably 50° C. to 80° C. or 90° C. to 120° C. or 120° C. to 190° C.

In the method according to the disclosure, the preheating container may include a particle material delivery means (closure) and the particle material delivery means may be set to deliver a defined volume of particle material. The volumes advantageous for this purpose have already been described above and are equally applicable here.

In the method according to the disclosure, any particle material suitable for 3D printing may be used, wherein the particle material is preferably a sand, a coated sand, a ceramic powder, a metal powder, a polymer, or a cellulose-based material.

The method according to the disclosure may be any known 3D printing process, e.g., the method may be a phenolic resin process, a high-speed sintering process, or an inorganic process.

In the method according to the disclosure, the build area or/and the build field can additionally be set to a defined temperature. The temperature may be set to 50° C. to 190° C., preferably 50° C. to 80° C. or 90° C. to 120° C. or 120° C. to 190° C.

In the method according to the disclosure, advantageously, the processing of a layer can be performed within 25 to 90 seconds, preferably less than 60 seconds.

A device according to the disclosure in one aspect includes a prior art 3D printer with components well known to the skilled person, e.g., a particle material supply, a coater, a print head for dosing binder, a build platform, a controller, and optionally at least one heat source for heating and/or tempering the particle material above ambient temperature, and, according to the disclosure, a preheating container.

According to the disclosure, it is proposed to bring the particle material to a desired temperature in the feed container (preheating container). This has the advantage that the amount of particle material to be heated has a sufficient residence time in the feed container, so that the necessary heating power remains limited. In addition, the particle material heated in this way is processed directly in the process area over a short distance. For this purpose, the feed container has a structure on the inside that has the largest possible contact surface with the particle material. Advantageously, the particle material moves by gravity from the top of the feed container to the bottom, where a slide mechanism or rotary feeder provides controlled metering of the particle material into the recoater. In the process, the outflowing particle material moves past the inner structure and absorbs heat via contact with the structure. The structure itself may, for example, consist of elongated electrically operated heating rods that have additional fins to improve heat transfer. For this purpose, the heating rods advantageously have a surface made of a material with good thermal conductivity, such as steel. The fins can also advantageously be formed from such a material. The structure should be configured in such a way that the particle material can move around it, but no bottlenecks are created where the particle material flow can come to a standstill. This means that the distances of the lamellas and the rods from each other but also from the feed container wall are sufficiently dimensioned.

As an example, the heatable length of such containers is as long as the recoater is wide, in the present case e.g. 1000 mm. The depth of the container in the exemplary embodiment is 60 mm and the height is 250 mm. Two 3.6 m long four heating rods, each with 3 bends, are installed in the container. They extend over the entire length and are held in position in a support structure.

Further Exemplary Description of the Disclosure

Various aspects of the disclosure will be described below by way of example and should not be construed as restrictive. Also, any aspect of the exemplary Figures shown below can be made usable in any combination.

Figure 1:
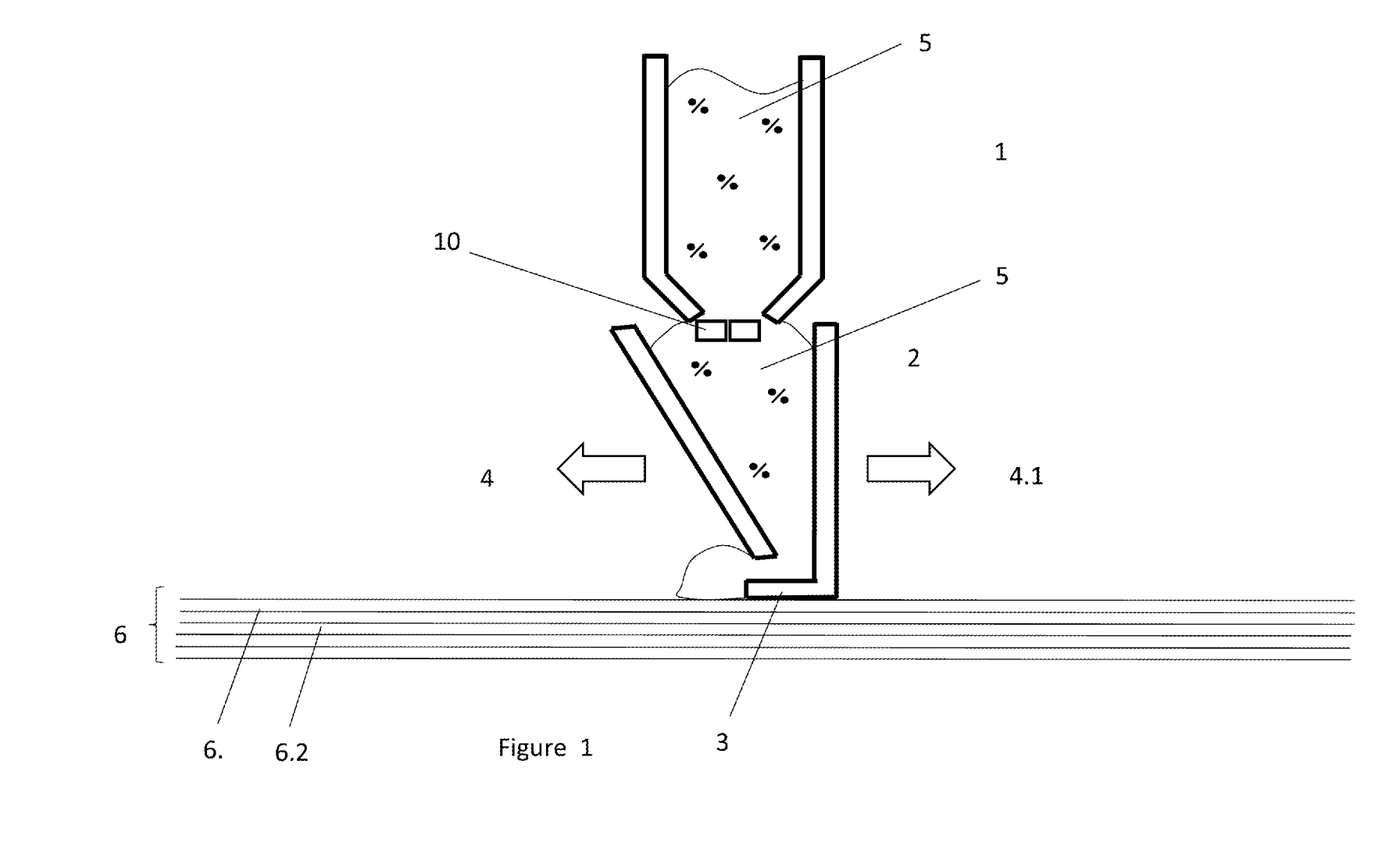
FIG. 1 shows a prior art device and process flow.

FIG. 1 shows a device and a process sequence according to the prior art, wherein the particle material (5)—also referred to as bulk material—is fed from a powder reservoir (1) (feed container) into a recoater (2); the discharge of the particle material can be controlled via a closure (10). For example, the particle material is dispensed here by means of a coating blade (3), with particle material layers (6, 61, 6.2) of a defined thickness being formed on the build field (not shown). The particle material is applied by moving the recoater (2) over the build field in the direction of travel (4) and the opposite direction (4.1). After each particle material layer application, the build field is lowered by a desired height or the recoater (2) is raised. This process is repeated until the desired molded part or parts have been produced. There is no temperature control or heating in the feed container or the recoater.

Figure 2:
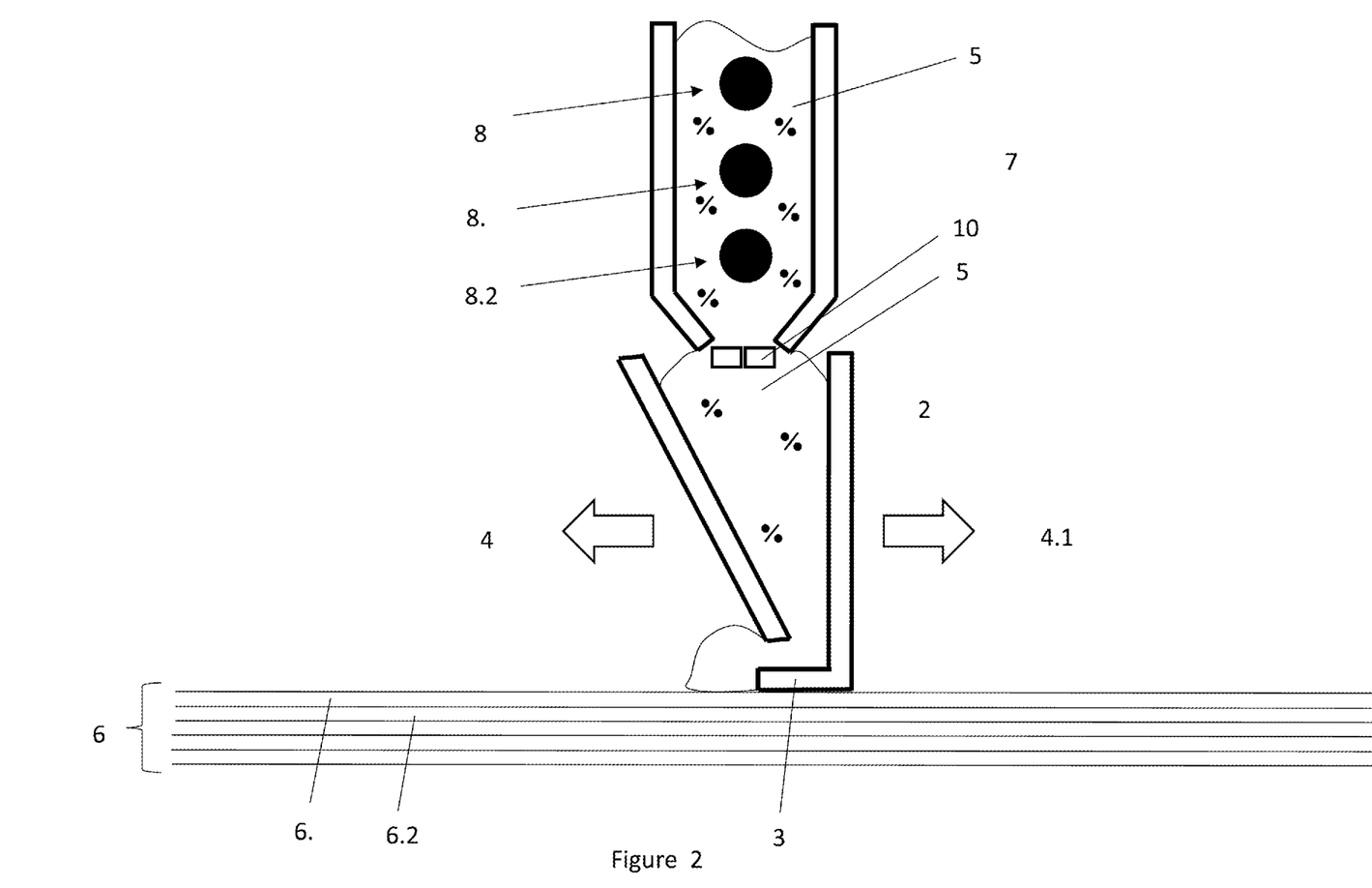
FIG. 2 shows a lateral view of an exemplary device according to the invention.

FIG. 2 shows a lateral view of an exemplary device according to the invention, with a recoater as shown in FIG. 1, which is filled via a preheating container (7). The preheating container (7) has heating elements (8, 8.1, 8.2) around which particle material (5) flows and can thus be heated to a predetermined temperature. A defined quantity (volume) of particle material can be discharged into the recoater by means of the closure (10). The closure (10) can be configured as a slide, by means of vibration and bridging, or in other suitable ways. In an alternative embodiment, the particle material (5) can also be dispensed directly onto the build field when working without a recoater for particle layer creation, but by means of a particle material feed quantity, which is then achieved by means of a so-called roller via a roll or a slide on the build field for the creation of a defined particle material layer.

Figure 3:
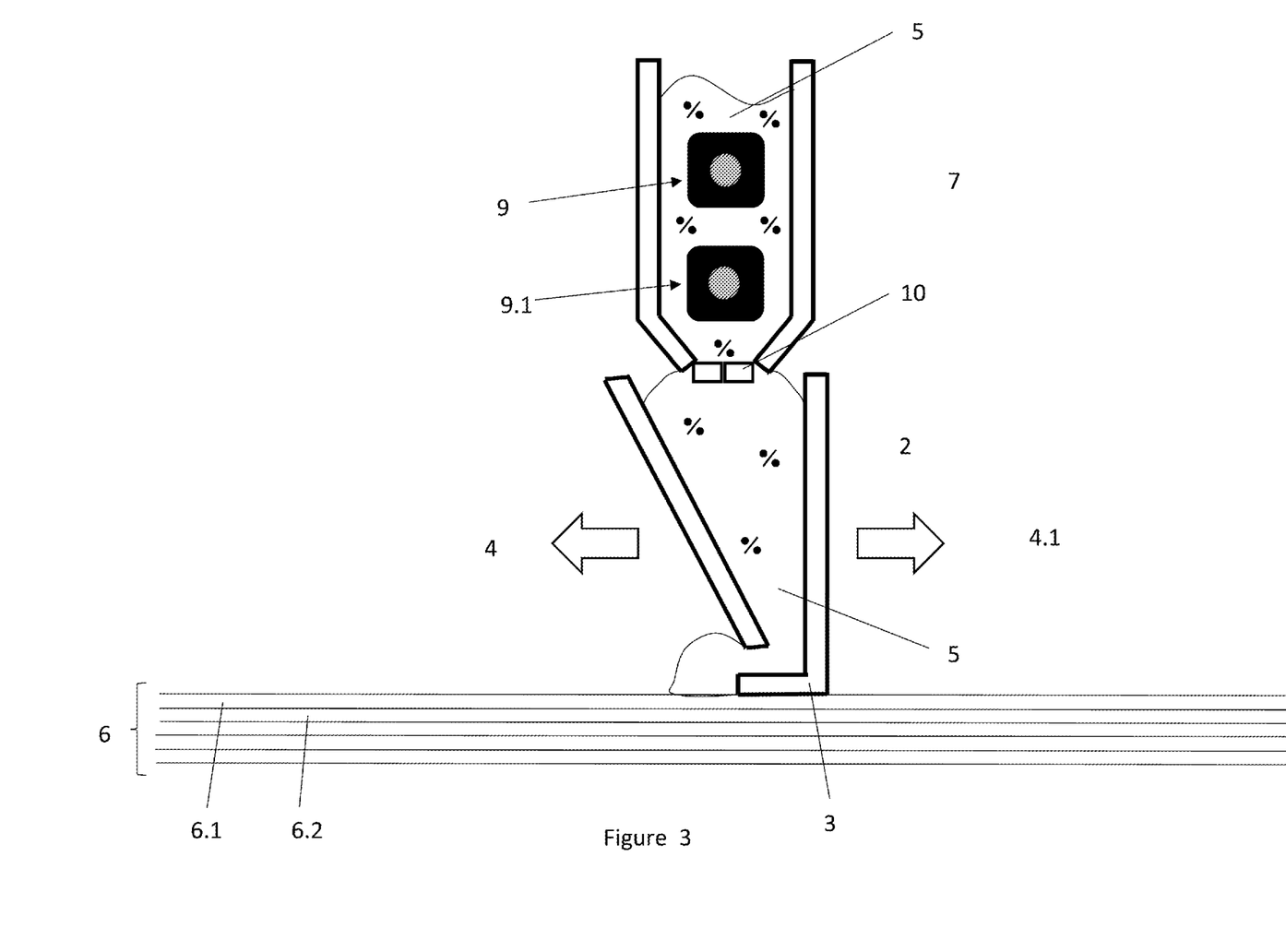
FIG. 3 shows a lateral view of an exemplary device according to the invention.

FIG. 3 shows a lateral view of an exemplary device according to the invention, with the components essentially corresponding to those of FIG. 2, with two heating elements arranged in the preheating container (7), which are configured as ribbed tube heaters (9, 9.1) and around which particle material flows in equal measure. Due to the contact and a relatively long residence time, effective and targeted heating of the particle material (5) can be achieved, so that heating in the recoater or/and on the build field is essentially no longer necessary. In this case, the heating element can have a surface enlargement such as ribs, which further simplify the heating of the particle material. It is now possible to select the loading of the preheating container (7) according to the material requirements. In the case of insensitive materials such as sand, the preheating container can be loaded completely, while for more heat-sensitive materials such as plastics, a shorter residence time can be achieved by feeding less particle material (5) and thus discharging it more quickly into the recoater (2). It is also possible, in another variant of the invention, to selectively dispense a defined amount corresponding, for example, substantially to a layer thickness, or 1.2 to 1.9, or 2, 3, 4, 5, 6, 7, 8, 9, 10 or 11-12 layer thicknesses of particle material (5) into the recoater (2) via the closure (10). Advantageously, this allows even more precise temperature control of the particle material by further shortening the residence time in the recoater (2) and thus reducing the cooling in the recoater (2). Thus, with the device and method according to the invention, better overall temperature control can be achieved and there is no need to heat the particle material (5) on the build field itself. This is particularly advantageous if the components in the build area are to be exposed to elevated temperatures for as short a time as possible or not at all.

Figure 4:
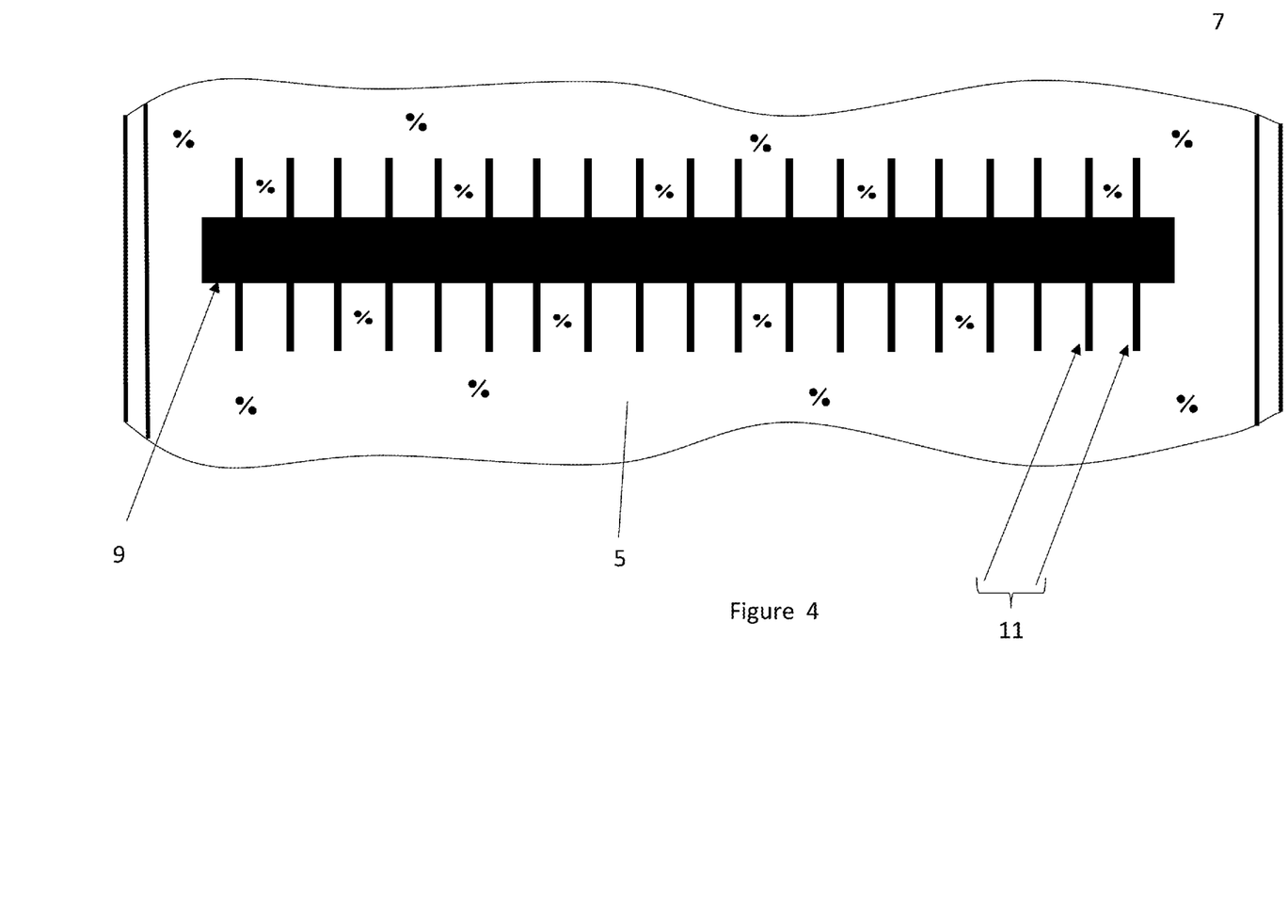
FIG. 4 shows an exemplary preheating container, with a heating element shown as an example.

FIG. 4 shows an exemplary preheating container (7), with a heating element (8) shown as an example. A preheating container (7) is shown schematically in a plan view with a heating element, the heating element being configured as a ribbed tube heater (9). To increase the surface area and improve heat transfer to the particle material (5), the heating element has ribs (11) as surface enlargements.

In the following, the invention will be described in more detail by way of various examples:

Example 1 Phenolic Resin Process

Binder jetting processes with thermosetting binders are known from the prior art. Here, the temperature required to cure the binder is either introduced into the particle material bed after the build process, e.g. via microwave treatment or other oven treatment, or the temperature is introduced into the particle material bed layer by layer during building. This is typically done by means of an IR radiation heating, e.g. in the form of a linear radiator, which in turn is located e.g. at the recoater in the immediate vicinity of the build field. The particle material can thus be deposited in a new layer and simultaneously brought to the necessary temperature. A disadvantage here is that the coupling of the IR radiation energy into typical particle materials such as quartz sands or ceramic materials is relatively poor and much energy is lost to the surrounding space.

This is visible, in particular, before the start of the actual printing process, when a first layer of quartz sand is applied to the build platform at ambient temperature, and this layer is to be brought to the desired build surface temperature. As a rule, several layers of building material are applied one after the other and treated with IR radiation until the desired temperature is reached on the build field. Typically, this preheating phase is up to 90 minutes, which is to be added to the actual building process and decreases the productivity of the device. In addition, the usable building height is reduced by the amount of the unprinted start layers, which in this specific example is around 20 mm.

With the device according to the invention, these problems can be solved very easily. In this specific case, a particle material, e.g. a quartz sand with an average particle size of 90 to 210 μm or more specifically 140 μm, is dosed via a silo with a larger capacity by conveying means, e.g. a screw conveyor, into a preheating container of a 3D printer of the type VX2000 from voxeljet AG. The preheating container holds approximately 8 kg of particle material. Inside it are placed several heating rods in the longitudinal direction. The heating rods are arranged in such a way that the particle material has to flow around the heating rods. The heating rods have a connected load of 6 kW and heat the particle material from ambient temperature of about 22° C. to a temperature of over 170° C. The hot particle material is filled in batches into a recoater hopper. The process takes place about every 2nd layer. The recoater hopper has electrically heated mats on its outside to minimize heat loss of the particle material through a cold recoater hopper wall. The particle material is then discharged onto the 2×1 m build field in layers with a thickness of 0.1 to 0.5 mm, usually 0.3 mm, by means of a recoater. The deposited quantity for this type of machine is approx. 800 g or 1400 g. The particle material then forms the new build field surface and has a temperature in the range of 90-110° C. after coating. This process is repeated for the initial layers before the start of a print job. Due to the uniform heating of the particle material, the heat loss of the first layers into the build field perimeter is relatively low, so that the desired temperature on the sand surface can be reached and stabilized after only 15 unprinted starting layers. After completion of the starting layers, the print head follows, which doses a thermosetting phenolic resin onto the build field in a computer-controlled and selective manner according to the predetermined layer data. The dosage amount is about 5-8% by weight. In this embodiment, the process chamber atmosphere has an average temperature of 45° C. When printing is complete, the recoater moves to the start position while passing an IR emitter over the build field, which ensures a further increase in the build field temperature to 110° C. The emitter is set to a power of 3 kW.

With the device according to the invention, the necessary energy input at the IR emitter can be reduced from 18 kW to 3 kW. Overall, the power required to heat the sand to the necessary temperature on the build field has decreased such that the speed of the recoater's irradiation pass can be increased from 100 mm/s to 500 mm/s, and that of the coating pass can be increased from 80 mm/s to 130 mm/s. The layer time thus drops significantly from 70 s to less than 40 s. Another positive effect is that the temperature of the process chamber atmosphere is kept constant at 45° C. and no air conditioning unit is required at an ambient temperature of 25° C. Last but not least, the heat-up phase of the device decreases from around 80 min to around 20 min when the starting layers are deposited, and the usable build height is reduced by only around 5 mm instead of around 20 mm.

The process of coating, printing and irradiation is repeated until the desired molded part has been built up. Once the build process is complete, the filled job box is removed from the 3D printer and cooled at ambient conditions for a few hours before the unprinted sand is removed via vacuum suction and the printed structures can be removed. Standard bending bars oriented in the direction of printing have a flexural strength of 350-400 N/cm$^2$ at an LOI of 2.2-2.4% by weight.

Example 2: 10B (Inorganic Binding) Process

Here, too, a particle material is used, e.g. a quartz sand with an average particle size of 90 to 210 μm or more specifically 140 μm. The particle material may be premixed with a so-called promoter. The material is dosed via conveying means, e.g. a screw conveyor, into a feed container (preheating container) of a 3D printer of the type VX1000 from voxeljet AG. The preheating container holds about 8 kg of particle material. Inside it are placed several heating rods in the longitudinal direction. The heating rods are arranged in such a way that the particle material has to flow around the heating rods. The heating rods have a connected load of 6 kW and heat the particle material from ambient temperature of about 22° C. to a temperature of over 80° C. The hot particle material is filled in batches into a recoater hopper. The process takes place approximately every 3rd layer. The recoater hopper has electrically heated mats on its outside to minimize heat loss of the particle material through a cold recoater hopper wall. The particle material is then discharged onto the 0.6×1 m build field in layers with a thickness of 0.1 to 0.5 mm, usually 0.3 mm, by means of a recoater. The deposited quantity for this type of machine is approx. 240 g. The particle material then forms the new build field surface and has a temperature in the range of 40-50° C. after coating. After completion of the coating, the print head follows, which dispenses an inorganic binder onto the build field in a computer-controlled and selective manner according to the predetermined layer data. This binder consists of a mixture of dissolved water glasses and other solvents, which builds up strength as it dries. The dosage amount is about 2-5% by weight. Increasing the temperature in the particle material results in faster drying of the binder and thus less unwanted penetration into the unprinted areas.

With the device according to the invention, the necessary energy input during the layer build-up can be carried out completely via the preheating container. No additional heat source such as an IR emitter is required.

Once the build process is complete, the filled job box is removed from the 3D printer and can be fed to a post-process, which may include heat treatment. Standard bending bars oriented in the direction of printing have a flexural strength of 200-300 N/cm² at a residual moisture of 0.1-0.35% by weight after the post-process.

Example 3: High Speed Sintering Process Example 3: High Speed Sintering Process

Another process in additive manufacturing is high-speed sintering. In this process, a polymer powder, e.g. polyamide 12—PA12 for short—with an average particle size of 55 µm is processed. In contrast to the aforementioned binder jetting examples, the material is bonded by selective melting here. The particle material is applied to the build surface for this purpose. The layer thickness in this case is typically 80 µm. The fresh layer is now brought to a temperature of preferably 165-178° C. from the free upper side by means of radiation and from the previously applied layer below by means of heat conduction. A print head then selectively doses an absorber onto the areas to be solidified before another radiation source passes over the entire build field. The surfaces of the particle material layer wetted with absorber thus heat up above the melting point of the particle material and sinter. The unprinted parts of the build field are largely reflective or transparent to the selected radiation, retain the previously set temperature and thus remain loose. Once the build process is complete, the desired component can be removed from the building container and cleaned of the unprinted particle material. The part will have material properties typical of PA12.

The challenge in this process is temperature control. Thus, the particle material on the build field should have as constant a temperature as possible within the sintering window of the material. On the other hand, if it remains at this temperature for too long, it is damaged to such an extent that its properties change and it can therefore no longer be fully reused in the process. Furthermore, the print head must not be exposed to too high a temperature, otherwise it could be damaged. Typically, a working temperature of the print head is below 60° C. Therefore, the process chamber temperature should not exceed 50° C. Typically, a prior art HSS printer therefore has various systems for heating and cooling. The particle material can be brought to temperature, for example, by a panel-type emitter above the build field. The sintering temperature can be achieved on the printed surfaces by passing an emitter over them. The process chamber temperature, on the other hand, can be realized via a passive exhaust air concept or active cooling via an air conditioning unit.

The application of particle material with ambient temperature to the hot build field has a disadvantageous effect. In the worst case, this extracts so much heat from the preceding layer that the printed powder areas solidify and shrink, resulting in so-called warping. In this respect, it is advantageous for the particle material to be applied to have already reached a temperature close to that of the build field, if possible beforehand. It is obvious to control the temperature of the entire particle material supply accordingly. However, this is tedious and, on the other hand, it stresses the particle material for the time of the entire build process as well as the times for heating and cooling. For this reason, it is more effective and gentler on the particle material if the material is brought to the appropriate temperature shortly before application. Prior art devices use, among other things, heated recoaters for this purpose. A disadvantage here is that the time for heating the particle material is limited, because advantageously a recoater carries a supply of particle material that is only sufficient for a few layers. Accordingly, the new particle material filled into the recoater is applied to the build field within a few minutes. In addition, it can hardly be prevented that non-tempered particle material is also applied onto the build field due to the mixing in the recoater.

With the device according to the invention, a limited particle material supply in the feed container can be reliably preheated with low energy losses and a desired temperature in the particle material can be set. For this purpose, the material is stored in rather large quantities in a silo at ambient temperature and is conveyed via conveying means, e.g. a screw conveyor, into a feed container on demand. This is the case when the level in the container falls below a defined level, which is detected by a sensor. The feed container is equipped with the device according to the invention, by which the particle material, when metered into the recoater at the lower outlet, is heated to 90-140° C. The recoater itself, for example, has active insulation via electrically heated mats attached to the outer surfaces, which ensure that the temperature of the particle material does not drop during coating. Once on the build field, the new layer is brought to the desired temperature from below by the previous layer and on the free upper side by the panel-type emitter.

It is evident that the device results in a more uniform build field temperature than is possible with a prior art device. In particular, the zones at the edge of the build field show an overall better temperature uniformity.

LIST OF REFERENCE NUMERALS 1 powder reservoir
2 recoater
3 coating blade
4, 4.1 direction of travel (direction and opposite direction)
5 particle material (particle material bed)
6 particle material layers on the build field
6.1 particle material layers on the build field
6.2 particle material layers on the build field
7 preheating container
8 heating element
8.1 additional heating element
8.2 additional heating element
9, 9.1 ribbed tube heater
10 closure (particle material dispenser)
11 surface enlargement (ribs) on heating element

The invention claimed is:

1. A particle material preheating container suitable for a 3D printing device, said container comprising one or more heating means, wherein the heating means is/are arranged in the area intended to receive the particle material and wherein the heating means is/are substantially surrounded by the particle material wherein the particulate material preheating container includes a closure for dispensing preheated particulate material to a recoater.

2. A device suitable for a 3D printing method, said device comprising one or more particle material preheating containers comprising one or more heating means substantially surrounded by the particle material;
   wherein each of the one or more particulate material preheating containers includes a closure for dispensing preheated particulate material to a recoater.

3. The preheating container according to claim 1, wherein the preheating container is stationary, the preheating container is arranged in a stationary manner above the build field or/and laterally above the build field, or the preheating container is coupled to the recoater.

4. The preheating container according to claim 1, wherein the heating means is/are not at least partially integrated in the preheating container or/and is/are not at least partially integrated in side walls or a bottom part of the preheating container.

5. The preheating container of claim 1, wherein the preheating container includes a particle material delivery means and the particle material delivery means is adjustable to deliver a defined volume of particle material, optionally for delivery into the recoater/s or directly onto the build field, wherein the particle material delivery means is not configured as a blade.

6. The preheating container according to claim 5, wherein the defined volume is substantially equal to the volume of a particle material layer on the build field or is 1.2 to 1.9 times the volume of a particle material layer on the build field, or is 2, 3, 4, 5, 6, 7, 8, 9, or 10 times the volume of a particle material layer on the build field.

7. The device according to claim 2,
wherein the preheating container is arranged upstream of one or more recoaters,
wherein a heat source is integrated directly into the one or more heating means.

8. The device according to claim 7, wherein the heat source is configured as an electrically powered resistance heater, and
wherein the surface enlargement means are configured so as not to impede with or prevent gravity-induced material drainage, and
wherein the heating means substantially do not contact the container wall.

9. A method for producing a molded part by means of particle material application and selective solidification and all further process steps and process means necessary for this purpose, wherein the particle material is heated to a target temperature in a preheating container prior to introduction into the recoater or/and prior to application to the build field.

10. The method according to claim 9,
wherein the target temperature is 50° C. to 190° C., preferably 50° C. to 80° C. or 90° C. to 120° C. or 120° C. to 190° C., or/and
wherein the preheating container includes a particle material delivery means and the particle material delivery means is set to deliver a defined volume of particle material, or/and
wherein the particle material is a sand, a coated sand, a ceramic powder, a metal powder, a polymer, or a cellulose-based material, or/and
wherein the method is a phenolic resin process, a high-speed sintering process, or an inorganic process, or/and
wherein the build area or/and the build field is set to a defined temperature, or/and
wherein a coating cycle is performed within 20 to 90 seconds, preferably less than 60 seconds.

11. A device suitable for a 3D printing method comprising the preheating container of claim 1, and a build field for receiving the particle material.

12. The device of claim 2 wherein the one or more heating means is/are configured as heat conductors conducting heat from a source outside the container to the interior.

13. The device of claim 2, wherein the preheating container is stationary, the preheating container is arranged in a stationary manner above the build field or/and laterally above the build field.

14. The device of claim 2, wherein the preheating container is coupled to the recoater.

15. The device of claim 2, wherein the heating means is not at least partially integrated in the preheating container or/and is/are not at least partially integrated in a side wall, a bottom part or/and a coating blade of the preheating container.

16. The device of claim 2, wherein the preheating container includes a particle material delivery means and the particle material delivery means is adjustable to deliver a defined volume of particle material.

17. The device of claim 16, wherein the particle material delivery means is adjustable for delivery of a defined volume of particle material into a recoater; wherein the particle material delivery means is not configured as a blade.

18. The device of claim 16, wherein the defined volume is substantially equal to the volume of a particle material layer on the build field or is 1.2 to 1.9 times the volume of a particle material layer on the build field, or is 2, 3, 4, 5, 6, 7, 8, 9, or 10 times the volume of a particle material layer on the build field.

19. The device of claim 2, wherein the heating means includes a tubular structure.

\* \* \* \* \*